United States Patent

Christie et al.

[15] 3,684,868

[45] Aug. 15, 1972

[54] COLOR BAR CODE TAG READER WITH LIGHT-EMITTING DIODES

[72] Inventors: John B. Christie; Glenn W. Robison; Raymond C. Runquist, Jr., all of Dayton, Ohio

[73] Assignee: The National Cash Register Company, Dayton, Ohio

[22] Filed: Oct. 29, 1970

[21] Appl. No.: 85,076

[52] U.S. Cl. ........................235/61.11 E, 250/219 D

[51] Int. Cl. ............................G06k 7/10, E04g 17/00

[58] Field of Search .................235/61.11 E; 250/219

[56] References Cited

UNITED STATES PATENTS

| | | | |
|---|---|---|---|
| 3,145,291 | 8/1964 | Brainerd | 340/146.3 K |
| 3,496,340 | 2/1970 | Ryer | 340/146.3 K |
| 3,417,234 | 12/1968 | Sundblad | 235/61.11 E |
| 3,473,027 | 10/1969 | Freeman et al. | 235/61.11 E |
| 3,553,437 | 1/1971 | Boothroyd | 235/61.11 E |
| 3,572,945 | 3/1971 | Thompson | 235/61.11 E |
| 3,582,623 | 6/1971 | Rothery et al. | 235/61.11 E |

*Primary Examiner*—Daryl W. Cook

*Attorney*—Louis A. Kline and Albert L. Sessler, Jr.

[57] ABSTRACT

A color bar code reader used for detecting and reading recorded indicia having different and distinct light reflective characteristics; i.e., being manifested in the form of colored bars. The reader utilizes a photosensor and two light-emitting diodes, each having a particular output wavelength. The particular embodiment disclosed utilizes a gallium arsenide diode which emits infrared light at 9,000 Angstroms and a gallium arsenide phosphide diode which emits red light at 6,600 Angstroms. In operation, the two light-emitting diodes are alternately pulsed, with the outputs of each being directed an the recorded indicia. A lens system focuses the light-emitting diode radiation onto the recorded indicia. Depending upon the particular colored indicia being utilized, a certain amount of light is reflected, or not reflected, by the colored indicia back to the color bar code reader, where the radiation is concentrated by the lens system for transmission to the solid state photosensor. The photosensor generates a signal proportional to the reflected light which is related to the original light source. Circuitry determines the particular color which reflected the returned light. The generated photosensor signals, which are analog in nature, are processed and digitized by circuitry for a determination of the color represented and are then transmitted to some record keeper. The particular colors utilized with the present invention are white, green, and black, which are recorded on a record medium in the form of bars.

12 Claims, 11 Drawing Figures

INVENTORS
JOHN B. CHRISTIE
GLENN W. ROBISON &
RAYMOND C. RUNQUIST, JR.

BY Louis A Kline
Albert L Sessler Jr

THEIR ATTORNEYS

INVENTORS
JOHN B. CHRISTIE
GLENN W. ROBISON &
RAYMOND C. RUNQUIST, JR.

BY

THEIR ATTORNEYS

INVENTORS
JOHN B. CHRISTIE
GLENN W. ROBISON &
RAYMOND C. RUNQUIST, JR.

BY Louis A Kline
Albert L Sessler
THEIR ATTORNEYS

INVENTORS
JOHN B. CHRISTIE
GLENN W. ROBISON &
RAYMOND C. RUNQUIST, JR.

BY Louis A Kline
Albert L Sessler

THEIR ATTORNEYS

COLOR BAR CODE TAG READER WITH LIGHT-EMITTING DIODES

BACKGROUND OF THE INVENTION:

This invention relates to a color bar code pen reader utilizing light-emitting diodes and light-detecting means.

The record medium, to be read by the pen reader, includes a plurality of colored bars which are printed on a tag or similar element according to a predetermined code. The colored bars printed on the record medium form light reflective data coded tags or labels or other media which may be employed to advantage in many types of applications. The media may be attached to articles that are sold in stores or the like, and an operator, simply by scribing the color coded media with the pen reader, reads the color coded information. The decoded information may be transferred to a cash register for registering a sale, or to some form of record keeper. The utilization of such a reader greatly reduces the time which must be expended in servicing a customer at a grocery check-out counter, for example. It is only necessary, in utilizing the present system, for the operator to wave the pen across the color coded label in order to read the color coded bars, which results in the transmission of analog signals representative of the colors to a decoder, which then transmits the decoded signals to some record keeper.

The prior art is replete with identification systems which employ light beams to scan labels at a fast scanning rate. Representative of the prior art is U.S. pat. No. 3,417,234, which issued on Dec. 17, 1968, on the application of Gunnar E. Sundblad. These systems require accurate registration between the label and the scanning probe. Other forms of label identification systems in which a hand-held probe is used to read the label require clocking bars. This necessarily increases the physical size of the label, which adds to the cost and the complexity of any type of electronic reading system. The identification system utilized here with the disclosed pen reader requires no clocking bars, therefore reducing the size of the label.

The present invention provides an inexpensive and highly improved hand-held color bar code reader for the reading of colored bars.

CROSS REFERENCE TO RELATED APPLICATIONS:

The color bar code reader, subject of the present invention, is designed to be utilized in combination with a system such as those disclosed and claimed in the copending U.S. Pat. applications Ser. No. 837,514 and Ser. No. 837,850, both filed on June 30, 1969, by John B. Christie, Dzintars Abuls, and Wilfridus G. van Breukelen and by John B. Christie, respectively, and assigned to the assignee of the present invention.

SUMMARY OF THE INVENTION:

This invention is directed to a color bar code reader which employs a radiation detector and two radiation-emitting devices in the form of light-emitting diodes for the detection and reading of color coded labels with a color having a particular light-reflecting coefficient. The invention may be utilized in semi-automated check-out systems (although it is not necessarily restricted thereto) in which sensing of information from the record member is desired. In the disclosed embodiment, the reader includes a generally pen-like probe which is adapted to be held in the hand of an operator. In operation, one end of the probe, the reading end (that is, the light-emitting end) is scribed across the color coded label.

The two light-emitting diodes each have a light output of a particular and different wavelength; in this instance, red light at 6,600 Angstroms and infrared light at 9,000 Angstroms. The two light-emitting diodes are alternately pulsed in operation. A portion of the color coded tag is illuminated by the alternately pulsed light-emitting diodes through a lens system and a reflecting cone. The lens system focuses the radiated light from the light-emitting diodes, and the reflective cone directs the radiated light to that portion of the color coded tag lying along the optical axis of the lens system. Any light reflected by the illuminated color coded bars, as determined by the respective light-reflecting coefficients, on the record medium is sensed by the photosensor. As the probe reader is moved or scribed across the color coded tag, each bar, depending upon the particular color, reflects or does not reflect light back towards the probe reader; i.e., the photosensor. A signal is generated by the photosensor in response to detected infrared and red light and is transmitted to two separate channels, which are later compared to determine the color of the bar being traversed.

The bar colors used in this particular embodiment are white, black, and green. The white bars will reflect both the red light and the infrared light, the green bars will reflect the infrared light and absorb the red light, and the black bars will absorb both the red light and the infrared light.

Circuit means are included to convert the analog signals into digital signals representative of the detected colors for transmission to a record keeper such as a sales register, an accounting machine, or a visual display, as well as electronic computation and printout equipment.

Figures 1, 2:
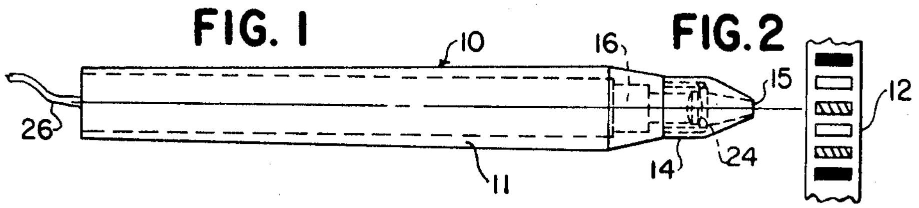
FIG. 1, on the sheet with FIGS. 2, 3, 4, 5, and 10, is a general view of the color bar code reader.
FIG. 2, on the sheet with FIGS. 1, 3, 4, 5, and 10, is a view of a color coded label for use with the color bar code reader.

DESCRIPTION OF THE PREFERRED EMBODIMENT:

FIG. 1 illustrates reading apparatus in the shape of an elongated pen, referred to as a color bar code reader 10.

FIG. 2 illustrates a tag 12 divided into a plurality of distinct colored areas, each area having a particular light-reflecting characteristic. The particular reflecting areas printed on the tag 12 are white, green, and black areas, which are in the form of bars. The colored bars are printed on the tag 12 according to a predetermined code, such as the transition code disclosed and claimed in the previously mentioned copending U.S. Pat. application Ser. No. 837,850, filed on June 30, 1969, titled Transition Code Recognition System. Briefly, the code consists of color transitions being identified as binary states "1" and "0" as set forth below:

| Color Transition | | | |
|---|---|---|---|
| white to black | | white to green | |
| black to green | =binary 1 | green to black | =binary |
| green to white | | black to white | |

It can be seen that there are three possible ways of identifying a binary 1 and three possible ways of identifying a binary 0.

Figure 3:
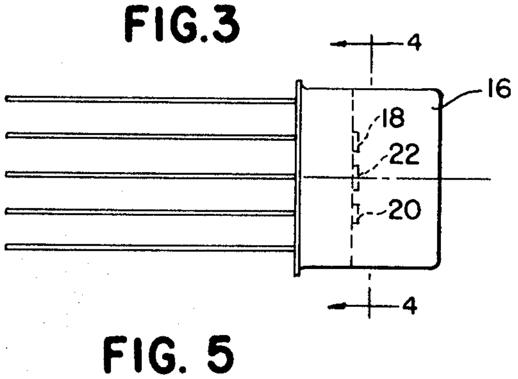
FIG. 3, on the sheet with FIGS. 1, 2, 3, 4, 5, and 10, is a general view of the detector package comprising the light-emitting diodes and the photosensor.
Figure 4:
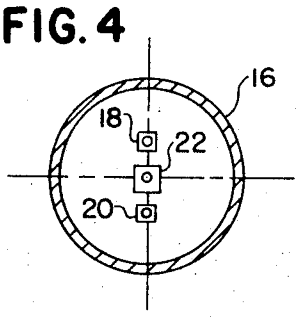
FIG. 4, on the sheet with FIGS. 1, 2, 3, 5, and 10, is a sectional view of FIG. 3 taken along the line 4—4.

The reading apparatus which is utilized in detecting and reading color coded bars comprises a housing 11, elongate in shape and terminated at one end by a reflective cone 14, which has an aperture 15 at its extreme end, and terminated at the other end by a wire cable 26, which is secured to the housing. Contained within the housing 11 is detector 16, which includes the combination of a gallium arsenide infrared-light-emitting diode 18, a gallium arsenide phosphide red-light-emitting diode 20, for emitting infrared and red light, and a solid state photosensor 22, all of which are shown more clearly in FIGS. 3 and 4. The detector 16 is so positioned and conventionally retained within the housing 11 that the photosensor 22 lies along the axis of both the housing 11 and the aperture 15 at the extreme end thereof. Contained within the reflective cone 14 is a lens system 24, positioned and conventionally retained in such a manner that its optical axis also lies on the axis of the photosensor 22 and the housing 11. The output light from the light-emitting diodes 18 and 20 alternately passes through the lens system 24, which concentrates the radiated light in the form of a light beam. The reflective cone 14 receives the concentrated light and directs it along the optical axis of the lens system, out through the aperture 15 of the reflective cone 14, and onto the tag or other medium 12. In operation, the light-emitting diodes 18 and 20 are alternately pulsed with a 25 percent duty cycle; i.e., one diode is on during the middle of the off period of the other diode. This will hereinafter be explained more fully.

The housing 11 is so designed that, when the extreme end of the reflector cone 14 is in contact with or in close proximity to the tag 12, the lightbeam generated by one of the pulsed diodes is caused to be directed on the tag 12. In general, the widths of the colored bars on the tag 12 are approximately the same dimensions as the diameter of the light beam in order to make the maximum efficient use of the light emitted by the diodes. The wire cable 26, shown extending from the other end of the housing 11, is utilized to carry signals generated by the photosensor 22 to the decoding circuitry. The photosensor 22 generates a signal in response to and proportional to the light reflected to the photosensor 22 from the color coded tag 12. As mentioned previously, the diode 18 emits infrared light, and the diode 20 emits red light. It is known that white will reflect both the red light and the infrared light, that green will reflect the infrared light and absorb the red light, and that black will absorb both the red light and the infrared light. These reflecting and absorbing characteristics enable circuitry to be designed to analyze the amounts of red light and infrared light which are reflected back from the tag 12 onto the photosensor 22. The photosensor 22, which is responsive to the reflected light, generates electrical signals which are proportional to the reflected light received. The generated signals are then amplified by a conventional amplifier located in the housing (not shown) and are transmitted to decoding circuitry via the wire cable 26.

Although the color bar code reader 10 is shown as a portable device, which in operation is manually manipulated by an operator to scan labels or other media contained on some package or apparatus, it is not necessarily restricted to such a form, since the color bar code reader could be made stationary and the item to be detected made mobile. In operation, it is necessary to have relative motion between the color bar code reader 10 and the color coded tag 12. The changing light patterns reflected by the different colored bars being traversed result in the generation of output signals by the photosensor 22.

Figure 5:
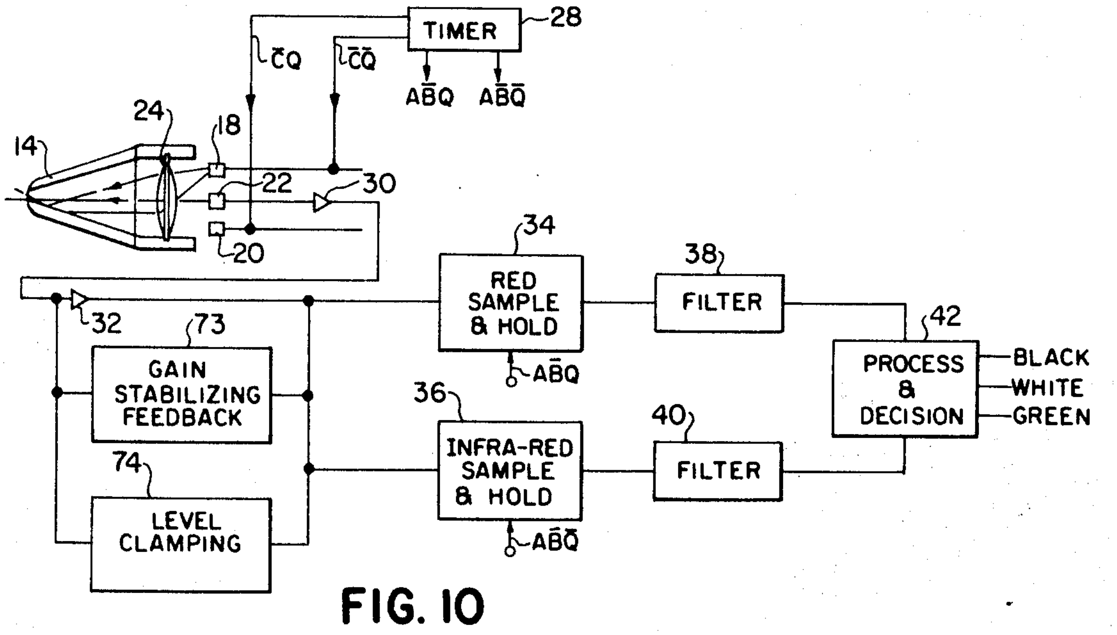
FIG. 5, on the sheet with FIGS. 1, 2, 3, 4, and 10, is a block diagram of the circuit means utilized with the probe reader.

Referring now to FIG. 5, which is a block diagram of the entire system, it can be seen that the light-emitting diodes 18 and 20 are alternately energized by pulses identified as $\bar{C}Q$ and $\overline{CQ}$, which are transmitted from a conventional timing unit. Light reflected from the interrogated label is directed back towards the photosensor 22, which generates a current proportional to the amount of light received. This signal is amplified by a conventional amplifier 30, which is positioned in the housing 11. The function of the amplifier 30 is to amplify the generated photosensor signal to a magnitude capable of being transmitted over the wire cable 26 to the logic circuitry. The amplified signal from the amplifier 30 is transmitted to a two-stage amplifier 32 (shown as one unit) having a conventional gain stabilizing feed back circuit 73 and a conventional level clamping circuit 74 associated therewith. The output of the two-stage amplifier 32 is sampled by two sample and hold circuits 34 and 36, which are alternately gated on during the middle portion of each on period of the light-emitting diodes by pulses which are identified as $A\bar{B}Q$ and $A\bar{B}\bar{Q}$ and which are generated by the timing unit 28. The sample and hold circuits 34 and 36 generate analog signals which are filtered by filters 38 and 40, respectively, and then are transmitted to process and decision circuitry 42 for conversion of the analog signals into digital signals representative of the color which initiated the analog signals. The output of the process and decision circuitry 42 is then transmitted to some reader register, sales register, or other record-keeping device.

In this embodiment of the invention, all of the necessary timing pulses for the light-emitting diodes 18 and 20 and for gating the sample and hold circuits 34 and 36 are generated from a 144KHz (seven microsecond period) MOS compatible clock. A five bit shift register which resets on the sixth clock pulse, a JK master slave flip-flop, and NAND-gates perform the required timing functions.

Figure 6:
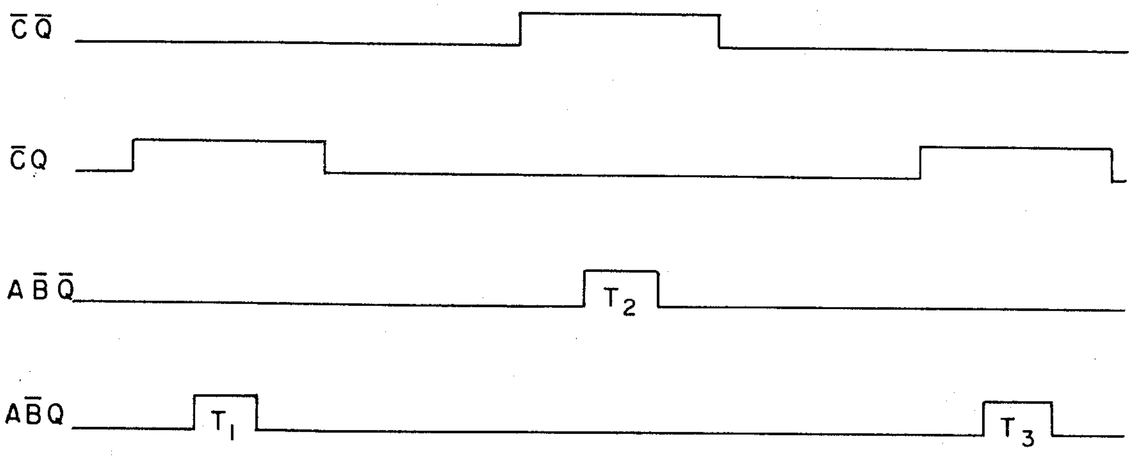
FIG. 6, on the sheet with FIGS. 8 and 9, is a view of the timing pulses used by the logic means.

FIG. 6 illustrates the wave forms which are utilized in gating the light-emitting diodes 18 and 20 and the sample and hold circuits 34 and 36. It can be seen that the two light-emitting diodes 18 and 20 are pulsed on in such a manner that one diode is on during the off period of the other diode. It can also be seen that the signal $A\bar{B}Q$ gates on the red sample and hold circuitry 34 during the middle portion of the on period of the red-light-emitting diode 20, and, similarly, the signal $A\bar{B}\bar{Q}$ gates on the infrared sample and hold circuitry 36.

Figure 7B:
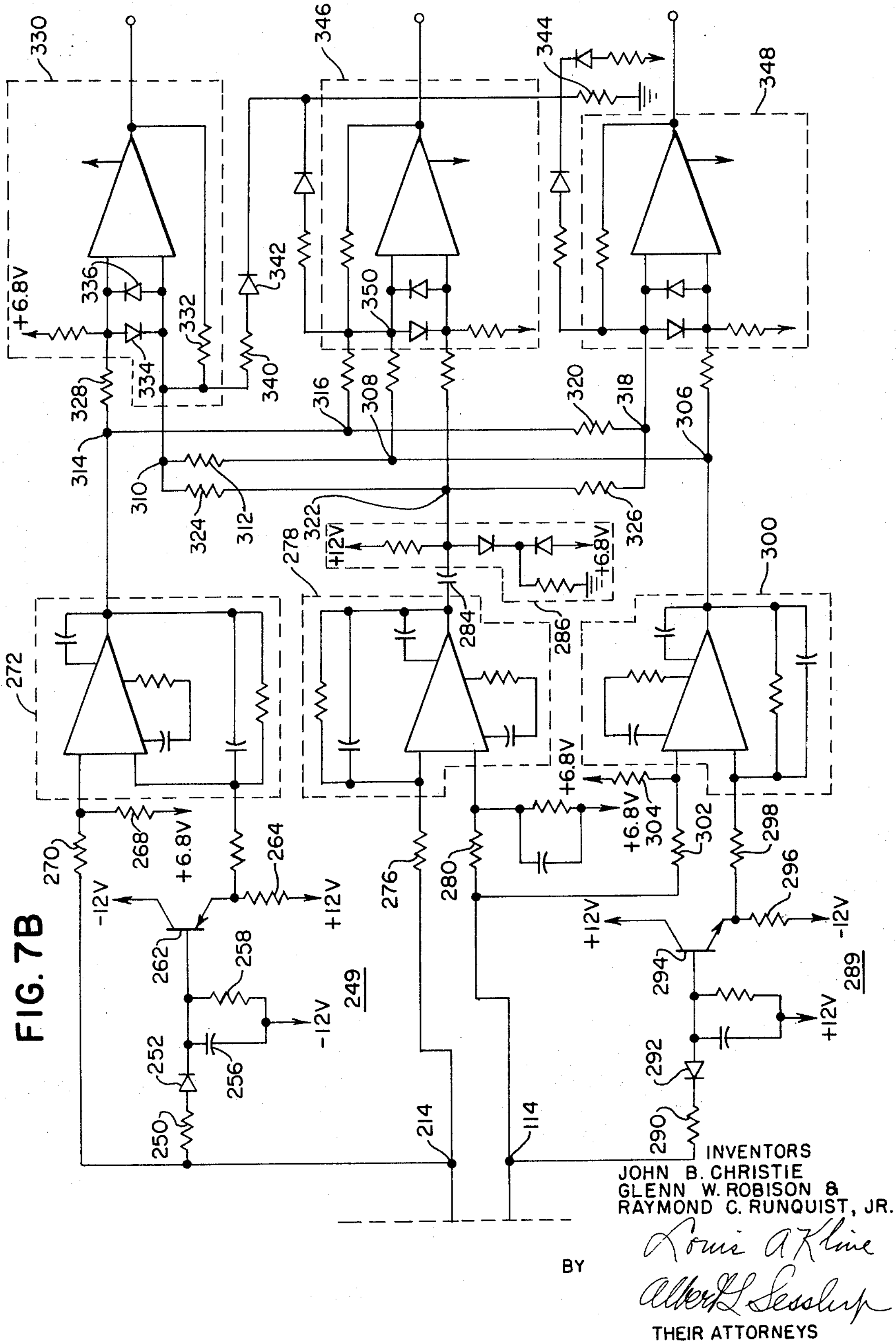
FIG. 7B is a schematic diagram of a second portion of circuit elements composing the process and decision circuitry.
Figure 7A:
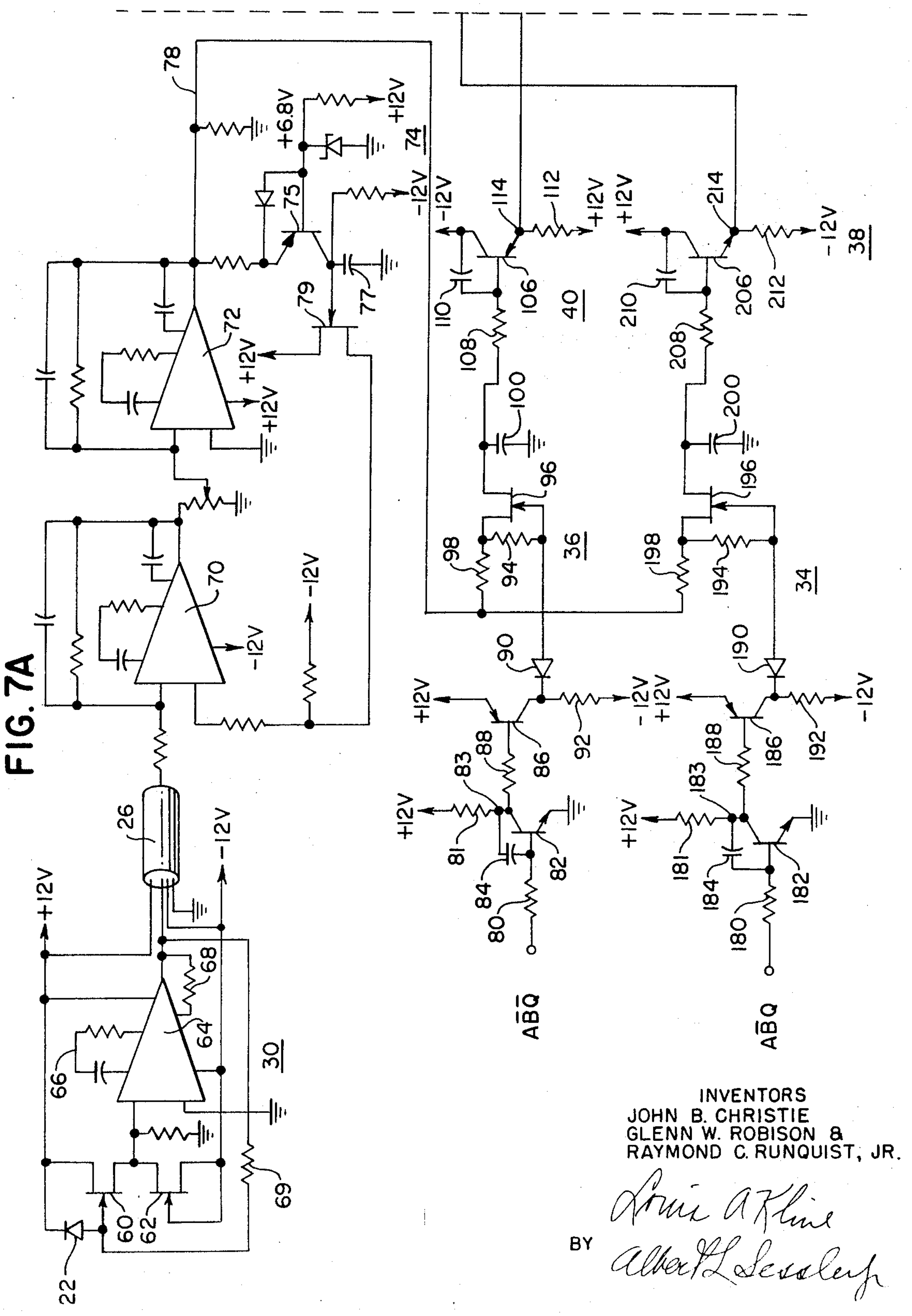
FIG. 7A is a schematic diagram of a first group of circuit elements utilized in the probe reader and in the sample and hold circuits.

Referring to FIG. 7A, the photosensor 22 is illustrated as having its cathode connected to a positive voltage source and its anode connected to the gate of a field effect transistor 60, commonly referred to as an FET, which is connected as a source follower and functions as a current amplifier. The source electrode of the FET 60 is shown connected to the drain electrode of an FET 62. The matched FETs 60 and 62 are used to provide a high input impedance at the gate of the FET 60 with negligible input offset voltage at the inverting input of the amplifier 64. At the time when the photosensor 22 detects reflected light, current representative of the reflected light is generated and is caused to pass through the gate-source path of the FET 60 and on to the negative input of a conventional linear operational amplifier 64. Conventional feed back and high frequency compensation techniques are utilized in the amplifier 64 and in all the amplifiers utilized in the circuitry constituting this invention; e.g., the RC path 66 and the resistor 68. The negative feed back path is provided via the resistor 69 connected between the output of the amplifier 64 and the negative input terminal of the amplifier 64 through the gate-source path of the FET 60.

As previously mentioned, the output of the photosensor 22 generates electrical current proportional to the amount of light detected by it. This current generates a voltage across the resistor 69 which is amplified by the linear operational amplifier 64 and then is transmitted through the wire cable 26 to resistance coupled conventional linear operational amplifiers 70 and 72, with the output of the amplifier 72 being clamped to + 6.8 volts by a conventional clamping circuit 74 to provide a reasonable linear operating range for the signals. The output of the amplifier 72 is transmitted, via a conductor 78, to the two sample and hold circuits 34 and 36, which are alternately gated on during the middle portion of each on period of the light-emitting diodes 18 and 20.

The sample and hold circuit 36 includes a limiting resistor 80 coupled to the base of a transistor 82. A capacitor 84 is connected between the base and the collector of the transistor 82 in order to provide a longer fall and rise time of the waveform which is applied to the collector of the transistor 82. The collector of the transistor 82 is coupled to a positive voltage source through a resistor 81. The collector of the transistor 82, at a junction point 83, is also connected to the base of a transistor 86 through a resistor 88. The emitter of the transistor 86 is connected to a positive voltage potential, while the collector of the transistor 86 is connected to the cathode of a diode 90 and is further connected over a resistor 92 down to a negative potential. The anode of the diode 90 is connected to a resistor 94 and to the gate electrode of a field effect transistor 96. The other end of the resistor 94 is connected to a junction formed by a resistor 98 and the source electrode of the FET 96. The other end of the resistor 98 is coupled to the output of the linear operational amplifier 72 via the conductor 78. The drain electrode of the FET 96 is coupled both to a holding capacitor 100, the other end of which is connected to ground, and to the base electrode of a transistor 106 through a resistor 108. A filtering capacitor 110 is coupled both to the base and to the collector of the transistor 106. The collector of the transistor 106 is further coupled to a negative potential, and its emitter is connected to a positive potential through a resistor 112. The output of the sample and hold circuit 36, which is an analog signal, is taken at the junction point 114, whence it is transmitted to the process and decision circuitry for determining the color of an interrogated color bar.

The sample and hold circuit 34 includes a limiting resistor 180 coupled to the base of a transistor 182. A capacitor 184 is connected between the base and the collector of the transistor 182 in order to provide a longer fall and rise time of the waveform which is applied to the collector of the transistor 182. The collector of the transistor 182 is coupled to a positive voltage source through a resistor 181, and is also connected, at a junction point 183, to the base of a transistor 186 through a resistor 188. The emitter of the transistor 186 is connected to a positive voltage potential, while the collector of the transistor 186 is connected to the cathode of a diode 190 and is further connected over a resistor 192 down to a negative potential. The anode of the diode 190 is connected to a resistor 194 and to the gate electrode of a field effect transistor 196. The other end of the resistor 194 is connected to a junction formed by a resistor 198 and the source electrode of the FET 196. The other end of the resistor 198 is coupled to the output of the linear operational amplifier 72 via the conductor 78. The drain electrode of the FET 196 is coupled both to a holding capacitor 200, the other end of which is connected to ground, and to the base electrode of a transistor 206 through a resistor 208. A filtering capacitor 210 is coupled to both the base and the collector of the transistor 206. The collector of the transistor 206 is further coupled to a positive potential, and its emitter is connected to a negative potential through a resistor 212. The output of the sample and hold circuit 34, which is an analog signal, is taken at the junction point 214, whence it is transmitted to the process and decision circuitry for determining the color of the interrogated color bar.

The pulse $A\bar{B}\bar{Q}$ (at time T2) is applied to the base of the transistor 82 through the limiting resistor 80, turning on the transistor 82 into full saturation. The capacitor 84 is utilized to provide a longer fall and rise time of the waveform which is applied to the collector of the transistor 82. When the transistor 82 is full on, the junction point 83 is driven to essentially zero potential. Simultaneously, current flow from the emitter to the base of the transistor 86 is caused to pass through the resistor 88 down to ground through the collector-emitter path of the transistor 82. This provides the biasing potential necessary to turn on the transistor 86, thus providing a current flow through the emitter-collector path of the transistor 86, through the resistor 92 down to the −12 volts potential source. This provides a positive potential of approximately twelve volts at the cathode of the diode 90, which effectively inhibits that diode from conducting during this portion of the sampling period.

The signal generated by the photosensor 22 is transmitted over the conductor 78 and is applied to the source electrode of the FET 96 via the resistor 98. The drop across the resistor 98 is not significant, being made a part of the circuit in order to prevent a capacitive load from being seen by the amplifier 72. Since the resistor 94 is so small when compared to the internal resistance of the FET 96, a positive potential is provided at the gate of the transistor 96, which is sufficient to turn the transistor 96 full on. The signal then passes through the source-drain path of the FET 96, where it is stored in the capacitor 100, which is the hold part of the sample and hold circuit 36. The charge on the capacitor 100 is sufficient to turn on the transistor 106, which is connected as an emitter-follower; therefore any voltage seen at the base i.e., the capacitor) will be seen at the emitter and is transmitted to a junction point 114. It is noted that the capacitor 100 will receive a peak charge only when the light beam is directed fully at a colored bar, resulting in maximum light reflection. The capacitor 110 is used to eliminate the spikes of the waveform. In the event that the light is impinging on the transition boundary of two colored bars, the reflection will not be maximum, which may result in the charge stored in the capacitor 100 (since there is a residue charge from previous times) being larger than the output of the amplifier 72, which would result in the capacitor 100 being discharged through the internal resistance of the amplifier 72.

The level-clamping circuit 74 operates in such a manner that, if the output of the amplifier 72 is more positive than the referenced +6.8 volts, the transistor 75 of the clamping circuit 74 will conduct, charging the capacitor 77 in a positive direction, which turns on the field effect transistor 79. Therefore, the signal charging the capacitor 77, a positive signal as seen by the amplifier 70, is transmitted to the positive input of the amplifier 70, which effectively lowers the output potential of the amplifier 72. The output signal of the amplifier 72 is also transmitted, during time T1, to the sample and hold circuit 34; more specifically, to the resistor 198 and on to the source electrode of the FET 196. As will be recalled, this signal is inhibited from passing through the diode 90 because at this time the diode 90 is reverse-biased by the emitter-collector current of the transistor 86. However, the signal which is transmitted through the resistor 198 passes through the resistor 194 to forward-bias the diode 190 on. Since the resistor 194 is large in comparison with the resistor 192, the resistor 194 will experience a large voltage drop. This voltage drop, in combination with the −12 volts to which the resistor 192 is connected, provides the necessary cut-off voltage to the gate of the FET 196. It is noted that, at this time (T1), the holding capacitor 200 will not receive any charging current because the FET 196 is cut off. However, the capacitor 200, which may have some residue charge, will turn on the transistor 206, which results in some output signal at the junction point 214.

During time T2, the sample and hold circuit 36 is gated on and operates in a manner similar to the operation of the sample and hold circuit 34, as explained above.

For a better understanding of the process and decision circuitry, reference is now made to FIG. 7B. Coupled to the junction point 214 is a filter circuit, utilized in generating a positive envelope signal from the transmitted red analog signal. The filter comprises a resistor 250 coupled to the anode of a diode 252, the cathode of which is connected to the base of a transistor 262. Interposed between the base of the transistor 262 and the cathode of the diode 252 is a parallel capacitor-resistor combination 256–258, which functions to smooth the waveform applied to the base of the transistor 262. The collector of the transistor 262 is connected to a negative voltage source, and its emitter is connected to a positive voltage source via a resistor 264. The emitter of the transistor 262 is connected to the negative input terminal of a differential linear operational amplifier connected as a subtracting amplifier 272 having conventional high frequency compensating and negative feed back circuits.

The junction point 214 is also coupled to the positive input of the subtracting amplifier 272 through a resistor 270. Interposed between the resistor 270 and the positive input of the subtracting amplifier 272 is a resistor 268, which is coupled to a positive reference potential for clamping purposes. The output of the subtracting amplifier 272 is coupled to a junction point 314.

The junction point 214 is connected through a resistor 276 to the negative terminal of a conventional subtracting amplifier 278 identical to the subtracting amplifier 272. The junction point 114 is coupled, via a resistor 280, to the positive terminal of the subtracting amplifier 278. The output of the subtracting amplifier 278 is capacitively coupled by a capacitor 284 to a junction point 322. The output of the subtracting amplifier 278 is clamped to a reference potential by a clamping circuit 286. The junction point 114 is also connected to a filter circuit 289 utilized in generating a negative envelope signal from the transmitted infrared signal. The filter circuit 289 comprises a resistor 290, which is connected to the cathode of a diode 292, the anode of which is connected to the base of a transistor 294 having its collector connected to a positive potential source and having its emitter connected to a negative potential source via a resistor 296. Interposed between the base of the transistor 294 and the anode of the diode 292 is a parallel resistor-capacitor combination which functions to smooth out the waveform amplified to the base of the transistor 294. The emitter of the transistor 294 is also connected to the negative input terminal, via a resistor 298, of a conventional subtracting amplifier 300 identical to the subtracting amplifiers 272 and 278. The junction point 114 is also connected via a resistor 302 to the positive input terminal of the subtracting amplifier 300. Interposed between the resistor 302 and the positive input terminal of the amplifier 300 is one terminal of a resistor 304, which is clamped to a positive voltage source.

The output of the amplifier 300 is coupled to junction points 306 and 208 and to a junction 310 via a resistor 312. The output of the amplifier 272 is coupled to the junction point 314 and a junction point 316, and to a junction point 318 via a resistor 320. The output of the amplifier 278 is coupled to the junction point 322, via a resistor 324 to the junction point 310, and via a resistor 326 to the junction point 318. The junction point 314 is connected, through a resistor 328, to the negative input of a conventional differential amplifier which is connected as a differential comparator 330 with a minimum threshold clamp. The amplifier 330 includes a positive feed back circuit which is formed by a resistor 332. The junction point 310 is connected to the positive input terminal of the differential comparator 330. Connected in parallel to both input terminals of the differential comparator 330 is a paralleled pair of oppositely poled diodes 334 and 336. The diodes 334 and 336 operate to prevent any overloading at the input terminals of the differential comparator 330. The negative input terminal of the differential comparator 330 is clamped to a positive reference potential. A series branch comprising a resistor 340 and a diode 342 is connected to ground through a resistor 344. This series branch circuit, which is connected to the positive input of the differential comparator 330, serves to provide a more negative input at the positive input terminal when both terminals of the differential comparator 330 are at reference or equal potentials. The process and decision circuitry also includes differential comparators 346 and 348, which are identical to the differential comparator 330, and, therefore, no detailed circuit description need be given.

It can be seen that the output signal from the differential amplifier 272 is transmitted to the negative input terminal of the differential comparator 330. The output signals from the differential amplifiers 278 and 300 are summed up at the junction point 310, which is coupled to the positive input terminal of the amplifier differential comparator 330. The output signal from the subtracting amplifier 278 is coupled to the negative input terminal of the differential comparator 346. The output terminals of the differential amplifiers 272 and 300 are summed at a junction point 350, which is connected to the positive input terminal of the differential comparator 346. The output signal from the subtracting amplifier 300 is coupled to the negative input terminal of the differential comparator 348. The output signals from the subtracting amplifiers 272 and 278 are summed up at the junction point 318, which is coupled to the positive input terminal of the differential comparator 348. The reasons for these connections will be explained in greater detail hereinafter.

Figure 10:
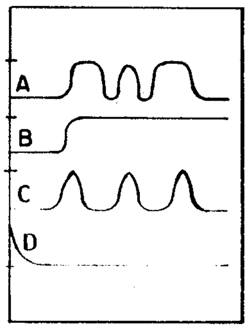
FIG. 10, on the sheet with FIGS. 1, 2, 3, 4, and 5, is a view of analog wave forms transmitted to the process and decision circuitry.

The subtracting amplifiers 272, 278, and 300 have their outputs referenced at +6.8 volts. The outputs of the subtracting amplifiers 272, 278, and 300 go negative, respectively, when white, green, or black bars are detected. The red analog signal (curve A of FIG. 10) is transmitted to the positive input terminal of the amplifier 272 from the junction point 214. A positive envelope is generated by the filter network 249 and transmitted to the negative input terminal of the subtracting amplifier 272. The positive envelope is the envelope of the red analog signal when green and black bars are detected (curve B of FIG. 10). The red analog signal input into the subtracting amplifier 272 is referenced at +6.8 volts by the referencing network 268, which necessarily references the output of the subtracting amplifier 272 at +6.8 volts. The subtracting amplifier 272 operates to subtract the positive envelope signal from the red analog signal, which yields a negative (with respect to the +6.8 volt reference) output at the subtracting amplifier only when a white bar is being traversed. For a better understanding, reference is now made to curves A & B of FIG. 10, specifically during the time interval designated T3. At this time, the red analog signal is down; i.e., below the reference potential of +6.8 volts, and the positive envelope is up; i.e., at the reference potential of +6.8 volts. Since the magnitude of the negative red analog signal at time T3 is greater than that of the positive envelope signal, the subtracting amplifier operates to subtract the positive envelope signal from the red analog signal, the output will be a signal which is down from the referenced +6.8 volts output; i.e., the output of the subtracting amplifier 272 is negative, which is indicative of a white color, since the red analog signal and the positive envelope signal will differ only when a white bar is detected. The subtracting amplifier 300 operates in a similar manner except that a negative envelope signal (curve D of FIG. 10), generated by the filter circuit 289, is subtracted from the infrared signal (curve C of FIG. 10). Again, it can be seen that the only time that the infrared signal and the negative envelope signal are different is at a time when a black bar is detected; e.g., at time T1, which results in a negative output signal from the subtracting amplifier 300.

The input signals to the subtracting amplifier 278 are the red analog signal and the infrared analog signal. Therefore, these are directly subtracted from each other by the subtracting amplifier 278. Since the infrared signal is at reference potential only upon the detection of a black bar and the red analog signal is at reference potential upon the detection of either green or black bars, it can be seen that any differences between two signals will be due to the detection of green bars, which results in a negative output at the subtracting amplifier 278, indicating that a green color has been detected. It is noted that the outputs of the subtracting amplifiers are also analog signals.

As previously mentioned, the amplifiers 330, 346, and 348 are connected as differential comparators in order to determine the exact color of the bar being detected and for transmitting a digital signal indicative of that color. The output of the amplifier 330 is at +12 volts upon the detection of a white bar and at −12 volts for any other colored bar. The output of the amplifier 346 is at +12 volts upon the detection of a green bar and at −12 volts for any other colored bars.

Similarly, the output of the amplifier 348 is at +12 volts upon the detection of a black bar and at −12 volts for any other colored bar.

The outputs of the subtracting amplifiers 272, 278, and 300 are transmitted to the junction points 314, 322, and 306, respectively, the junction points all being clamped to a +6.8 voltage level. These outputs are directly fed into the negative inputs of the differential comparators 300, 346, and 348, respectively. The input signals to the positive input terminals of each of the differential comparators 330, 346, and 348 are formed by the summation of the two output signals from the subtracting amplifiers not directly connected to the negative input terminal of a particular differential comparator and constitute a threshold signal. For example, the input signal to the positive input terminal of the differential comparator 330 is formed by the summation of the output signals from the subtracting amplifiers 278 and 300 at the junction point 310.

The differential comparator operates in such a manner that, as long as the positive input terminal is more negative than the negative input terminal, the output is maintained at −12 volts. This occurs in the absence of a color signal at the inputs. When a color signal is present at the negative input terminal, the output will be maintained at +12 volts. Since the presence of a color generates the absence of a +6.8 volt threshold signal, it can be said that a dynamic threshold signal is generated by this method. For example, if a white color is present, the output of the differential comparator 330 will rise to +12 volts, while the outputs of the remaining differential comparators 346 and 348 will remain at −12 volts.

Figure 9:
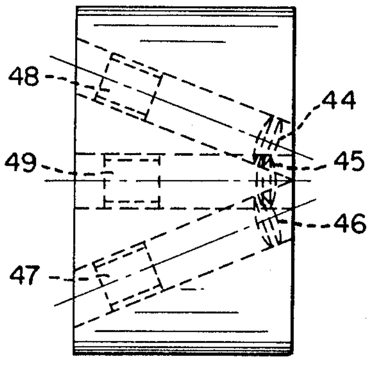
FIG. 9, on the sheet with FIGS. 6 and 8, is a side elevational view of FIG. 8.
Figure 8:
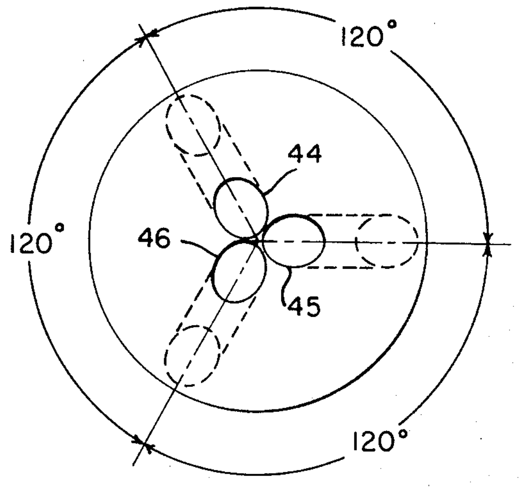
FIG. 8, on the sheet with FIGS. 6 and 9, illustrates an alternate embodiment, in which three lenses are so placed that the optical axis of each is coincident on the color coded tag.

An alternate embodiment of the invention is represented in FIGS. 8 and 9. Three lenses 44, 45, and 46 are so positioned that their respective optical axes are coincident on the tag surface. The light-emitting diodes 47 and 48 are thus focused separately onto a tag with the reflection received by the photosensor 49. The detection of the color bars is performed as previously described.

The above-described system can be made to operate at speeds up to 60 inches per second.

WHAT IS CLAIMED IS:

1. A detecting and identification system for use with a record medium containing information in the form of coded areas having different radiation-reflecting coefficients, the system comprising:

a plurality of radiation-emitting sources;

timing means for energizing said radiation-emitting sources;

means for concentrating and directing the output of said radiation-emitting sources onto said coded areas, whereby the output of said radiation-emitting sources is reflected according to the radiation-reflecting coefficient of said coded areas;

a radiation detector for sensing the reflected radiation and generating signals proportional to the amount of the reflected radiation; and circuit means for decoding said generated signals;

said radiation sources comprising first and second light-emitting diodes, one of which radiates red light and the other of which radiates infrared light, and said radiation detector comprising a photosensor.

2. A system according to claim 1 wherein said coded areas consist of a plurality of contiguous and adjacent colored bars of first, second, and third colors, further including the requirement that adjacent colored bars are never of the same color, said first color reflecting both infrared and red light, said second color essentially absorbing all infrared and red light, and said third color reflecting said infrared light and essentially absorbing all red light.

3. A system according to claim 2 wherein said circuit means for decoding includes first and second sampling circuits responsive to said generated signals, said first sampling circuit being turned on when said infrared-light-emitting diode is on and said second sampling circuit being turned on when said red-light-emitting diode is on.

4. A system according to claim 3 in which said first sampling circuit is turned on by said timing means during the middle portion of the on period of said infrared-light-emitting diode and in which said second sampling circuit is turned on by said timing means during the middle portion of the on period of said red-light-emitting diode.

5. A system according to claim 4 wherein said first sampling circuit generates an infrared analog signal proportional to the amount of infrared light detected by said radiation detector and said second sampling circuit generates a red analog signal proportional to the amount of red light detected by said radiation detector.

6. A system according to claim 5 including first circuit means for generating a negative envelope of the infrared analog signal and second circuit means for generating a positive envelope of the red analog signal.

7. A system according to claim 6 including a plurality of subtracting amplifiers for subtracting the negative infrared envelope from the infrared analog signal, so that a negative output is indicative of a black color, for subtracting the positive red envelope signal from the red analog signal, so that a negative output is indicative of a white color, and for subtracting the red analog signal from the infrared signal, so that a negative signal is indicative of a green color.

8. A system according to claim 7 further including means for digitizing the output signals from said subtracting amplifiers.

9. A system according to claim 1 wherein said means for concentrating and directing the output of said radiation emitting source comprises a lens and a reflective cone having an aperture at the extreme end thereof, said lens and said reflective cone being so positioned that the axis of the aperture and the optical axis of the lens lie on the same line.

10. A system according to claim 9 further including a generally elongated housing, said radiation sources, said radiation detector, and said means for amplifying said generated signals being disposed within said housing, said housing terminated at one end by said reflective cone.

11. A system according to claim 9 in which said housing is terminated at its other end by a wire cable.

12. A detecting and identification system for use with a record medium containing information in the form of areas having different light-reflecting coefficients, the system comprising:

a substantially elongated housing terminated at one end by a reflective cone including an aperture at the extreme end thereof;

red- and infrared-light-emitting diodes disposed within said housing;

a photosensor disposed within said housing;

means for alternately controlling the output of said red- and infrared-light-emitting diodes disposed within said housing;

an optical lens disposed within said housing for concentrating light emitted from said red- and infrared-light-emitting diodes and directing the same through the aperture of said reflective cone onto said coded areas, whereby said coded areas reflect a certain portion of the infrared and red light according to their respective light-reflecting coefficients;

a photosensor for sensing the reflected infrared and red light and generating signals proportional to the amount of the reflected infrared and red light;

first circuit means for receiving and holding said generated signal corresponding to reflected infrared light;

second circuit means for receiving and holding said generated signal corresponding to said reflected red light; and third circuit means responsive to said first and second circuit means for decoding said generated signals.

* * * * *

UNITED STATES PATENT OFFICE
CERTIFICATE OF CORRECTION

Patent No. 3,684,868 Dated September 5, 1972

Inventor(s) John B. Christie, et al

It is certified that error appears in the above-identified patent and that said Letters Patent are hereby corrected as shown below:

Column 3, line 34, after "green to black) = binary" insert -- 0 --.

Signed and sealed this 1st day of May 1973.

(SEAL)
Attest:

EDWARD M. FLETCHER, JR.
Attesting Officer

ROBERT GOTTSCHALK
Commissioner of Patents